United States Patent [19]

Cartossi

[11] Patent Number: 5,439,165
[45] Date of Patent: Aug. 8, 1995

[54] METHOD FOR FORMING A STAINLESS STEEL COOKING UTENSIL WITH A DECORATED BASE

[75] Inventor: Ferdinando Cartossi, Baveno, Italy

[73] Assignee: Cartossi S.r.l., Ornavasso, Italy

[21] Appl. No.: 191,556

[22] Filed: Feb. 4, 1994

[30] Foreign Application Priority Data

Feb. 11, 1993 [IT] Italy ............................. MI93A0249

[51] Int. Cl.$^6$ ............................................. B23K 20/00
[52] U.S. Cl. ..................... 228/265; 228/190; 228/193; 228/235.1; 220/453
[58] Field of Search ............ 228/115, 190, 193, 234.1, 228/235.1, 265; 29/160.6, DIG. 101; 220/453, 468, 912

[56] References Cited

U.S. PATENT DOCUMENTS

| | | | |
|---|---|---|---|
| 3,952,938 | 4/1976 | Ulam | 228/190 |
| 4,264,030 | 4/1981 | Bergan | 228/190 |
| 4,354,301 | 10/1982 | Takeuchi et al. | |

FOREIGN PATENT DOCUMENTS

| | | |
|---|---|---|
| 0070177 | 1/1983 | European Pat. Off. . |
| 0221848 | 5/1987 | European Pat. Off. . |
| 0512271 | 11/1992 | European Pat. Off. . |

*Primary Examiner*—Samuel M. Heinrich
*Attorney, Agent, or Firm*—Steinberg, Raskin & Davidson

[57] ABSTRACT

The method enables a stainless steel cooking utensil to be formed with a decorated base, the base being of the type comprising three layers, of which one is an intermediate layer of a good heat conducting metal and the other two layers are of stainless steel. Compared with traditional methods for forming normal utensils of the aforesaid type, there is a further step of positioning on the outer stainless steel layer at least one sheet portion of a metal having a melting point not less than that of the metal forming the intermediate layer. An aluminum foil is interposed between the sheet portion and the outer stainless steel layer if the metal of the sheet portion does not enable a direct permanent connection to be achieved between the sheet portion and the outer layer. A decoration can also be obtained on the inside of the utensil base in a similar manner.

26 Claims, 2 Drawing Sheets

METHOD FOR FORMING A STAINLESS STEEL COOKING UTENSIL WITH A DECORATED BASE

BACKGROUND OF THE INVENTION

This invention relates to a method for forming a stainless steel cooking utensil with a decorated base, the utensil being of the type comprising a stainless steel vessel, to the base of which there is applied an intermediate layer of a good heat conducting metal (such as aluminum or copper), this intermediate layer being covered externally by an outer covering layer also of stainless steel.

The invention also relates to the cooking utensil obtained in this manner.

Various methods are known for forming cooking utensils of the aforesaid type. One of these methods is described in Italian patent 965732 and consists essentially of the following steps:

1) positioning a plate of a metal of good thermal conductivity, preferably aluminum, and of suitable thickness, on the outer face of the base of the actual vessel;
2) positioning a stainless steel covering layer on said plate;
3) heating the assembly to a temperature close to but less than the melting point of the metal of said plate; and
4) applying an impact pressure to the assembly to achieve permanent connection between the various constituent elements of the base.

The utensil obtained in this manner therefore has a three-layer base, of which the intermediate layer is a good heat conductor.

OBJECT AND SUMMARY OF THE INVENTION

The main object of the present invention is to provide a method for constructing stainless steel utensils having their base decorated with a certain design.

This object is attained by the constructional method of the invention which, compared with the aforedescribed conventional method, comprises between said steps 2) and 3) a further step 2') consisting of positioning on the stainless steel covering layer at least one sheet portion of a metal with a melting point not less than that of the constituent metal of the plate of good thermal conductivity, the sheet portions being suitably shaped and positioned on the covering layer to obtain the required designs; between an individual sheet portion and the stainless steel covering layer there being interposed an aluminum connection foil if the constituent metal of the sheet portion is such as not to allow a direct permanent connection to be obtained between the sheet portion and the outer covering layer as a result of the subsequent steps 3) and 4) of the method.

The design obtainable in this manner, in the most simple case involving a single sheet portion, can be a simple geometrical figure such as a circle or a polygon, deriving from an analogous configuration of the sheet portion.

Much more complicated designs can obviously be obtained. The maximum design complication achievable is determined only by practical feasibility.

The sheet portions can be of stainless steel, so that the resultant appearance of the outer surface of the utensil base is a design in the manner of an engraving, consisting of figures of the same shape as the sheet portions. In this respect, as a result of steps 3) and 4) an individual sheet portion becomes embedded or set into the stainless steel covering layer, which consequently deforms to receive the sheet portion. The plate of good conductivity metal likewise deforms to allow the deformation of the covering layer.

The thickness of the intermediate plate of good thermal conductivity metal, before effecting steps 2'), 3) and 4), must not be less than the sum of the thicknesses of the sheet portion, the aluminum connection foil and the stainless steel covering layer, so that during the application of step 4) the intermediate plate can deform to an extent sufficient to accommodate the deformation which the outer covering layer undergoes in receiving the sheet portion.

There remains well visible on the base of the utensil a fissure of linear extension defining one (if only one sheet portion is provided) or more (if more than one sheet portion is provided) areas formed by the individual embedded sheet portions. A decoration is hence obtained consisting of a design in the manner of an engraving reproducing the shape of the sheet portion or sheet portions. In the stated case in which stainless steel sheet portions are used, the surface within the areas has the same color as the rest of the outer surface of the utensil-base. Even in this case, these areas do not necessarily have to have wholly or partly the same appearance as the surface which receives them. In this respect the surface of these areas can be subjected to a type of finish different from that of the remaining part of the outer surface of the utensil base, for example by previously polishing the sheet portions or vice versa.

Again, some of the areas each defined by a sheet portion can have a polished surface and the others not, according to the aesthetic effect to be obtained.

In addition to stainless steel other metals can be used for the sheet portions, such as iron, copper, brass and titanium. In all cases, for obvious feasibility reasons, the metal of the sheet portions must have a melting point not less than that of the good conductivity metal forming said plate.

If sheet portions of a metal having a color different from that of stainless steel are used, and in the limit using several sheet portions of different metal, the aesthetic effect can be even more varied. A base can hence be obtained with a multi-color design. To prevent dirt accumulating in the fissure bordering the sheet portions following the use of the utensil, the fissure should conveniently be fairly thin. As the width of the fissure depends on the thickness of the sheet portions, the thinner the sheet portions the narrower the fissure. In any event it is not convenient to use sheet portions which are not thin, for obvious heat transfer reasons.

From the aforegoing it is apparent that if the sheet portion is of aluminum or of a metal which as a result of steps 3) and 4) of the method will be permanently fixed to the outer layer of the utensil, then it is not necessary to provide the connection foil between the sheet portion and covering layer.

A single sheet portion can consist of a number of parts of different metals, for example several layers of different metals. This is achieved by using for the sheet portion a laminated construction, directly available commercially, formed from two (so-called 2-ply) or more (3-ply, 4-ply etc.) layers of different metals.

An individual sheet portion can also consist of several regions (in plan view) of different metals.

The aluminum connection foil can be previously applied to that face of an individual sheet portion which faces the outer stainless steel layer. This is achieved for example by initially spraying aluminum onto said face of the sheet portion by known methods. Alternatively a preformed laminated construction of the aforesaid type comprising a number of layers of different metals can be used, of which the outer layer is of aluminum to form the connection foil, while the remaining layer or layers form the actual sheet portion.

Using the method of the present invention it is also possible to easily form not only a utensil with a decorated base but also a utensil of the type heatable by induction.

As is well known to the expert of the art, heating cooking utensils by induction has recently assumed considerable importance because of its advantages. This heating method requires special cooking utensils of which the base contains a layer of a metal of high magnetic permeability. AISI 304 steel, which is of low magnetic permeability, is normally used to construct stainless steel cooking utensils. If a stainless steel utensil of the said type but heatable by induction is required, the covering layer is formed of stainless steel of high magnetic permeability, for example AISI 340.

Hence it is apparent that if at least a part of one of the sheet portions of the aforedescribed method is of a metal of high magnetic permeability, a cooking utensil is obtained which not only has a base decorated with a particular aesthetic effect but can also be heated by magnetic induction.

In utensils of this type formed in this manner it has been surprisingly noted, inter alia, that base warping, typical of conventional magnetic induction-bearable utensils with a base comprising an outer layer of stainless steel of high magnetic permeability is substantially reduced. As is well known to the expert of the art, this drawback of known magnetic induction-heatable utensils formed by traditional construction methods results in the need for a further step, known as gauging, involving impact pressure exerted on the utensil base to flatten it and reduce this drawback to acceptable terms, if not eliminating it completely.

A significant advantage of the method of the invention is that the machines and equipment used in the described traditional method for constructing known stainless steel cooking utensils can be used for its implementation.

In order to obtain a more varied aesthetic effect, an individual sheet portion can be provided with holes the shape and size of which depend only on the shape and size of the sheet portion and on feasibility.

Other sheet portions, preferably of a metal different from that of the sheet portion comprising the hole or holes, can be inserted into said holes.

By a modification of the method of the present invention it is also possible to obtain a cooking utensil of the aforesaid type having on the inner surface of its base a decoration of type similar to that formed on the outer surface of the utensil base, the former being additional or alternative to the latter. This is attained by providing a further step as a replacement for or in addition to the step 2'), to be implemented not subsequent to step 3) of the aforedescribed method, and consisting of positioning on the inner surface of the base of the actual vessel of the utensil at least one additional sheet portion of a metal having a melting point not less than that of the metal of the plate of good thermal conductivity, that surface which is to form the free surface of the additional sheet portion once embedded into the base of the vessel being of a metal having good resistance to corrosion by food, the sheet portions being suitably shaped and positioned to obtain the required design, between an individual sheet portion and the inner surface of the vessel base there being interposed an additional aluminum connection foil if the metal of the additional sheet portion is of a type which does not allow a direct permanent connection between the additional sheet portion and the vessel base by implementation of steps 3) and 4) of the method.

The aforesaid additional step is effected normally between steps 2) and 3) of the described method. However the actual position of this additional step relative to the other steps of the method also depends on the type of equipment used for implementing the method.

Again in this case the additional sheet portion can consist of a number of parts of different metal, in particular a number of layers, the sheet portion then preferably being obtained from a preformed laminated construction.

Again, the additional connection foil can be previously applied to the additional sheet portion, for example by spraying aluminum onto that face thereof which is to face the base of the utensil, or by again using a preformed construction comprising several layers of different metals, the outer layer of which is of aluminum to form the additional connection foil.

As already stated, the present invention also relates to a stainless steel cooking utensil with a decorated base, obtained by the aforedescribed method.

As is well known to the expert of the art, cooking utensils constructed of AISI 304 stainless steel are subject to attack, mainly in the flat region of the inner surface of the utensil base. This is due to the precipitation of acids and salts deriving from chemical reactions produced by the food cooked or contained in the utensil.

Advantageously, if the sheet portion used for the internal decoration is titanium or a special stainless steel having a higher corrosion resistance than the stainless steels usually used, such as AISI 316L, and is of suitable shape (preferably circular), size and location, it also fulfils the object of substantially improving corrosion resistance of the flat inner surface of the utensil.

The invention will be more apparent from the detailed description of one embodiment of the method and one embodiment of the cooking utensil obtained which are given hereinafter by way of example.

DESCRIPTION OF THE DRAWINGS

The description is given with reference to the accompanying drawings, in which.

DETAILED DESCRIPTION OF THE INVENTION

Figure 1:
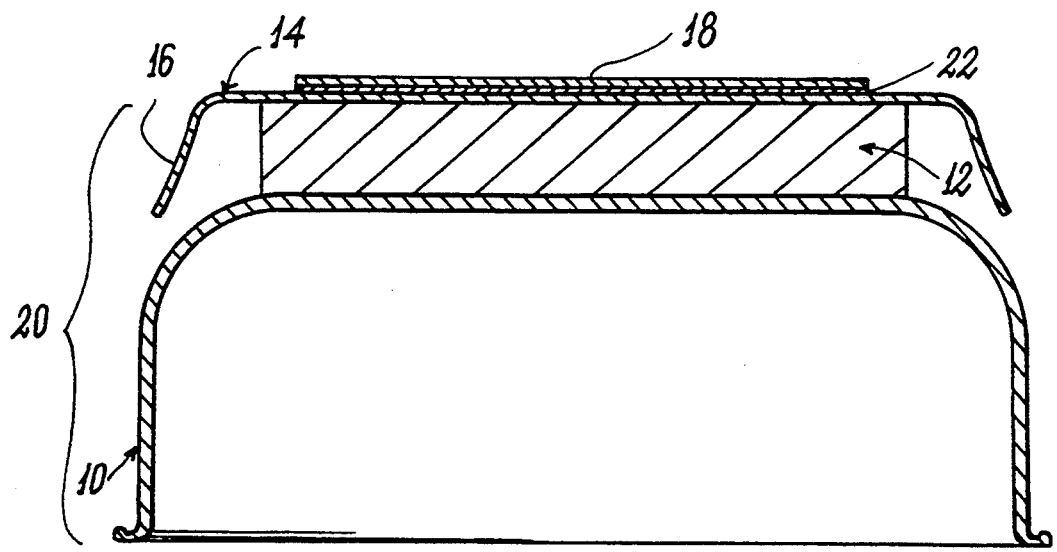
FIG. 1 is a coaxial vertical section through the assembly of elements forming the cooking utensil they being shown in their required position for the implementation of step 4) of the constructional process.

With reference to FIG. 1, step 1) of the method of the present invention consists of positioning an aluminum plate 12 on the outer face of the base of the actual vessel 10. As stated, the thickness of the plate 12 and its thickness must be suitably chosen on the basis of the required result.

Step 2) of the method consists of positioning on the plate 12 a covering layer 14 of stainless steel, normally of the same type (AISI 304) as that used for the vessel 10. As can be seen from FIG. 1, the covering layer 14 has its edge directed downwards so as to completely cover the intermediate aluminum layer 12' (see FIG. 2) when step 3) of the method has been effected.

It should however be noted that the covering layer need not comprise the edge 16. In this case, when the utensil has been formed the lateral edge of the intermediate layer of good thermal conductivity metal will remain visible as it is not covered.

In accordance with step 2') of the method a metal sheet portion 18 is now positioned on the covering layer 14. If the metal of the sheet portion 18 is of a type (for example stainless steel) which does not allow a permanent connection to be obtained between the sheet portion 18 and the stainless steel covering layer 14 by implementing steps 3) and 4), step 2') also comprises interposing an aluminum foil 22, visible in FIGS. 1 and 2, between the sheet portion 18 and the covering layer 14 and corresponding to that region in which they are superposed, to enable the required permanent connection to be achieved.

The sheet portion 18 can be of stainless steel of the type used for the vessel 10 and/or for the covering layer 14, but may also be of a different type of steel and in the limit even a non-stainless steel, or may be iron, aluminum, copper, titanium, brass, nickel or other metals, depending on the result to be obtained.

As already stated, the sheet portion 18 can be of any shape, depending on the type of design to be obtained on the outer surface of the utensil base. For example by using a circular, polygonal or star-shaped sheet portion, following implementation of the method a circular, polygonal or star-shaped design is obtained on the outer surface of the utensil base.

Instead of a single sheet portion, as in the case illustrated, a number of sheet portions of the required shape can be used, distributed over the covering layer 14 in such a manner as to obtain the desired aesthetic effect.

With the method of the present invention, having completed step 2') an assembly of elements as shown in FIG. 1 and indicated by the reference numeral 20 is obtained. In practice the various constituent elements of the assembly 20 are conveniently held temporarily together by one or more weld spots.

Figure 2:
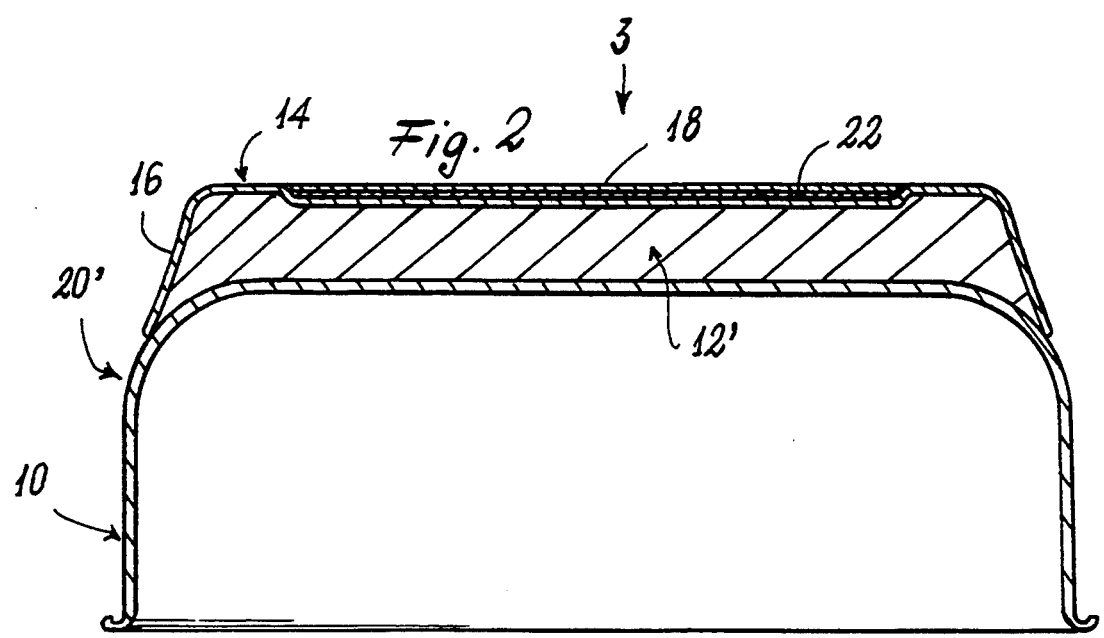
FIG. 2 is a section similar to FIG. 1 but showing the formed utensil at the end of step 4)

To now implement step 3) of the method, the assembly 20 obtained in this manner is heated to a temperature close to but less than the melting point of the aluminum of the plate 12. Having done this, the assembly 20 is mounted over a conventional punch (not shown), after which using a die (also not shown) an impact pressure is applied to the assembly 20 such as to permanently connect together the various constituent elements of the base, in accordance with step 4) of the method. FIG. 2 shows the situation at the end of step 4) of the method. As can be seen, as a result of the impact pressure of step 4) as applied by the die and by virtue of the temperature to which the assembly 20 (FIG. 1) has been previously raised in step 3), both the aluminum plate 12 and the covering layer 14 deform. If, as mentioned, the thickness and volume of the plate 12 have been chosen in accordance with the stated criteria, the entire space between the base of the vessel 10 and the covering layer 14 becomes filled, with the formation of the so-called intermediate layer 12'. As can be seen from FIG. 2 the sheet portion 18 also becomes embedded or set into the covering layer 14, which itself becomes partly embedded in the intermediate layer 12'.

Figure 3:
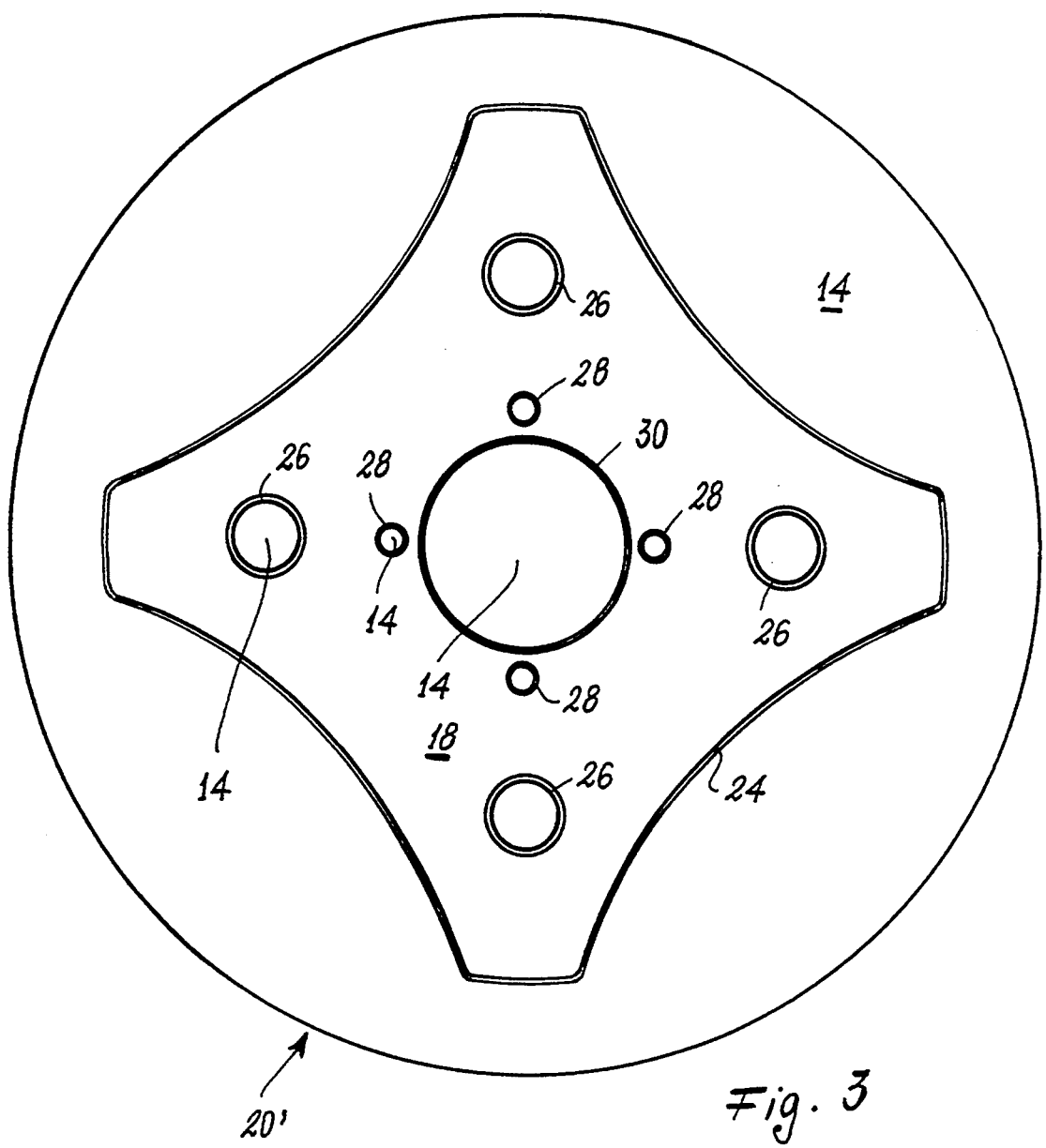
FIG. 3 is a plan view of the utensil of FIG. 1, seen from above in the direction of the arrow 3.

By way of example, FIG. 3 shows the appearance of the outer surface of the base of the utensil 20' of FIG. 2. FIG. 3 amply shows the fissure 24 which borders the perimeter of the sheet portion 18. As stated, the thinner the sheet portion 18 the thinner the fissure 24.

In the specific case shown in FIG. 3, the sheet portion 18 also comprises various holes of three different diameters.

Specifically, four circular holes 26, four smaller circular holes 28 and a central hole 30 of greater size can be seen. Each is surrounded by a relative circular fissure. As can be seen in FIG. 3, the stainless steel of the intermediate layer 14 appears flush within these holes unless the holes are closed by further sheet portions, possibly of a metal different from that of the sheet portion 18. As stated, the sheet portion 18 can also be of a metal of high magnetic permeability, with the result of obtaining not only a design on the outer surface of the utensil base, but also a cooking utensil heatable by magnetic induction. In particular the sheet portion 18 can be of AISI 340 stainless steel, which has high magnetic permeability.

In this case, in addition to the already stated reasons (achieving a fairly thin fissure surrounding the sheet portion in addition to heat transfer considerations) there are a further two reasons for using a fairly thin magnetizable sheet portion. Firstly it is a known fact that the thinner the sheet portion the higher the efficiency of the heating method for the current induced.

In addition, the thinner the sheet portion the smaller the deformation tension which it exerts on the utensil base, so preventing or at least reducing to an acceptable value the base deformation present in conventional stainless steel utensils heatable by magnetic induction. There is therefore no longer the need for the already mentioned conventional "gauging" of the base of such cooking utensils.

In this case the shape and size of the sheet portions, and hence the choice of possible designs obtainable, are conditional on the requirement of obtaining a magnetic induction-heatable cooking utensil with good heating efficiency.

If a multi-layer sheet portion is used, a cooking utensil heatable by magnetic induction can be obtained if at least one of the sheet portion layers is a metal of high magnetic permeability.

If a design is also required on the inside of the utensil base, one or more additional sheet portions (not shown) analogous to the sheet portions 18 and having the shape and dimensions necessary for obtaining the required design are positioned on the inner surface of the base of the actual vessel 10.

For reasons which will be apparent to the expert of the art, in practice these sheet portions can only be of stainless steel or titanium. For these metals an additional aluminum connection foil must be provided between the additional sheet portions and the base of the actual vessel. The size of this additional foil will correspond to the region in which the additional sheet portions are superposed on the base.

To obtain a cooking utensil in which the flat part of the inner base surface has a higher corrosion resistance, an additional sheet portion of titanium or stainless steel of high corrosion resistance can be provided occupying at least the entire flat part of the base. In practice this additional sheet portion is conveniently circular, with a diameter equal to the diameter of the flat part.

The cooking utensil obtained by the described method can then undergo finishing operations (such as the polishing of certain parts and the application of handles).

I claim:

1. A method for forming a stainless steel cooking utensil with a decorated base, the utensil being of the type comprising a stainless steel vessel, to the base of which there is applied an intermediate layer of a good heat conducting metal, this intermediate layer being covered externally by an outer covering layer of stainless steel, the method comprising the following steps:
   1) positioning a plate of a metal of good thermal conductivity and of suitable thickness on the outer face of the base of the vessel;
   2) positioning a stainless steel covering layer on said plate;
   3) heating the assembly to a temperature close to but less than the melting point of the metal of said plate; and
   4) applying an impact pressure to the assembly to achieve permanent connection between the various constituent elements of the base; and said method further comprising providing between said steps 2) and 3) a further step 2') consisting of positioning on the stainless steel covering layer at least one sheet portion of a metal with a melting point not less than that of the constituent metal of the plate of good thermal conductivity, the sheet portions being suitably shaped and positioned on the covering layer to obtain the required design.

2. A method as claimed in claim 1, wherein not all the sheet portions are of the same metal.

3. A method as claimed in claim 1, wherein an individual sheet portion consists of several parts of different metal.

4. A method as claimed in claim 3, wherein the parts of different metal are in the form of layers.

5. A method as claimed in claim 4, wherein the sheet portion is obtained from a preformed multi-layer construction.

6. A method as claimed claim 1, wherein at least part of a sheet portion consists of a metal of high magnetic permeability.

7. A method as claimed in claim 6, wherein the metal of high magnetic permeability is a stainless steel of a type possessing this characteristic.

8. A method as claimed in claim 1, wherein in addition to step 2') there is provided a further step, to be implemented not subsequent to step 3) of the method, and consisting of positioning on the inner surface of the base of the actual vessel of the utensil at least one additional sheet portion of a metal having a melting point not less than that of the metal of the plate of good thermal conductivity, that surface which is to form the free surface of the additional sheet portion once embedded into the base of the vessel being of a metal having good resistance to corrosion by food, the additional sheet portions being suitably shaped and positioned to obtain the required design.

9. A method as claimed in claim 8, wherein not all the additional sheet portions are of the same metal.

10. A method as claimed in claim 8, wherein an individual additional sheet portion consists of several parts of different metal.

11. A method as claimed in claim 10, wherein the parts of different metal are in the form of layers.

12. A method as claimed in claim 11, wherein the additional sheet portion is obtained from a preformed multi-layer construction.

13. A method as claimed in claim 8, wherein that surface which is to form the free surface of the additional sheet portion once embedded into the base of the vessel is of a metal having high resistance to corrosion by food.

14. A method as claimed in claim 13, wherein the constituent metal of the free surface of the additional sheet portion is titanium and/or AISI 316L stainless steel.

15. The method of claim 1, further comprising the step of interposing an aluminum connection foil between an individual sheet portion and the stainless steel covering layer.

16. A method as claimed in claim 15, wherein the aluminum foil is formed directly on the relative sheet portion by spraying aluminum.

17. A method as claimed in claim 15, wherein the foil and relative sheet portion are obtained from a preformed multi-layer construction having at least two layers, one of the two layers of the construction forming the aluminum connection foil and the other layer or layers forming the actual sheet portion.

18. The method of claim 15, wherein in addition to step 2') there is provided a further step, to be implemented not subsequent to step 3) of the method, and consisting of positioning on the inner surface of the base of the actual vessel of the utensil at least one additional sheet portion of a metal having a melting point not less than that of the metal of the plate of good thermal conductivity, that surface which is to form the free surface of the additional sheet portion once embedded into the base of the vessel being of a metal having good resistance to corrosion by food, the additional sheet portions being suitably shaped and positioned to obtain the required design.

19. The method of claim 18, further comprising the step of interposing an additional aluminum connection foil between an individual additional sheet portion and the inner surface of the vessel base.

20. The method of claim 19, wherein the additional aluminum connection foil is previously formed directly on the relative additional sheet portion by spraying aluminum.

21. The method of claim 19, wherein the additional aluminum connection foil and relative additional sheet portion are obtained from a preformed multi-layer construction having at least two layers, one of the two layers of the construction forming the additional aluminum connection foil and the other layer or layers forming the actual sheet portion.

22. The method of claim 8, further comprising the step of interposing an aluminum connection foil between an individual additional sheet portion and the inner surface of the vessel base.

23. A method as claimed in claim 22, wherein the aluminum connection foil is previously formed directly on the relative additional sheet portion by spraying aluminum.

24. A method as claimed in claim 22, wherein the aluminum connection foil and relative additional sheet portion are obtained from a preformed multi-layer construction having at least two layers, one of the two layers of the construction forming the aluminum connection foil and the other layer or layers forming the actual sheet portion.

25. A method for forming a stainless steel cooking utensil with a decorated base, the utensil being of the type comprising a stainless steel vessel, to the base of which there is applied an intermediate layer of a good heat conducting metal, this intermediate layer being covered externally by an outer covering layer of stainless steel, the method comprising the following steps:
1) positioning a plate of a metal of good thermal conductivity and of suitable thickness on the outer face of the base of the vessel;
2) positioning a stainless steel covering layer on said plate;
3) heating the assembly to a temperature close to but less than the melting point of the metal of said plate; and
4) applying an impact pressure to the assembly to achieve permanent connection between the various constituent elements of the base; and said method further comprising providing between said steps 2) and 3) a further step 2') consisting of positioning on an inner surface of the base of the actual vessel of the utensil at least one sheet portion of a metal having a melting point not less than that of the metal of the plate of good thermal conductivity, that surface which is to form the free surface of the sheet portion once embedded into the base of the vessel being of a metal having good resistance to corrosion by food, the at least one sheet portion being suitably shaped and positioned to obtain the required design.

26. The method of claim 25, further comprising the step of interposing an aluminum connection foil between an individual sheet portion and the stainless steel covering layer.

* * * * *